(12) United States Patent
Zhang et al.

(10) Patent No.: US 11,211,987 B2
(45) Date of Patent: Dec. 28, 2021

(54) METHODS, APPARATUS AND SYSTEMS FOR PERFORMING CHANNEL MEASUREMENT IN A MULTI-BEAM WIRELESS COMMUNICATION NETWORK

(71) Applicant: ZTE CORPORATION, Guangdong (CN)

(72) Inventors: Bo Zhang, Guangdong (CN); Kaiying Lv, Guangdong (CN); Bo Sun, Guangdong (CN); Chen Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/862,061

(22) Filed: Apr. 29, 2020

(65) Prior Publication Data

US 2020/0259542 A1 Aug. 13, 2020

Related U.S. Application Data

(63) Continuation of application No. PCT/CN2017/112204, filed on Nov. 21, 2017.

(51) Int. Cl.
*H04B 7/06* (2006.01)
*H04B 7/08* (2006.01)
*H04B 7/0417* (2017.01)

(52) U.S. Cl.
CPC ......... *H04B 7/0626* (2013.01); *H04B 7/0417* (2013.01); *H04B 7/0632* (2013.01);
(Continued)

(58) Field of Classification Search
CPC .. H04B 7/0619; H04B 7/0621; H04B 7/0626; H04B 7/0632; H04B 7/0643; H04B 7/0695; H04B 7/088; H04B 7/0417
See application file for complete search history.

(56) References Cited

U.S. PATENT DOCUMENTS 9,788,317 B2 * 10/2017 Ghosh ................ H04L 5/0092
10,863,375 B2 * 12/2020 Xiang ................ H04L 5/0048
(Continued)

FOREIGN PATENT DOCUMENTS

| CN | 101340620 A | 1/2009 |
| CN | 101461193 A | 6/2009 |

(Continued)

OTHER PUBLICATIONS

Matthew C. Gast, 802.11ac: A Survival Guide Chapter 4. "Beamforming in 802.11ac", Aug. 1, 2013 (Aug. 1, 2013), 27 pages.

*Primary Examiner* — Betsy Deppe
(74) *Attorney, Agent, or Firm* — Duane Morris LLP

(57) ABSTRACT

Methods, apparatus and systems for performing channel measurement in a multi-beam wireless communication are disclosed. In one embodiment, a method performed by a wireless communication node is disclosed. The method comprises: transmitting a channel measurement frame based on a plurality of beams to a wireless communication device through a channel between the wireless communication node and the wireless communication device; and receiving a feedback frame from the wireless communication device. The channel measurement frame comprises a training sequence including a plurality of repetitive segments. Each of the plurality of repetitive segments is transmitted based on a respective one of the plurality of beams. The feedback frame comprises channel information of the channel with respect to at least one beam of the plurality of beams.

15 Claims, 13 Drawing Sheets

(52) U.S. Cl.
CPC ......... *H04B 7/0643* (2013.01); *H04B 7/0695* (2013.01); *H04B 7/088* (2013.01)

(56) References Cited

U.S. PATENT DOCUMENTS

| | | | |
|---|---|---|---|
| 2012/0122392 A1* | 5/2012 | Morioka | H04B 7/0695 455/25 |
| 2016/0295581 A1 | 10/2016 | Ghosh et al. | |
| 2017/0250831 A1* | 8/2017 | Aldana | G01S 5/021 |
| 2017/0279507 A1 | 9/2017 | Kim et al. | |

FOREIGN PATENT DOCUMENTS

| | | |
|---|---|---|
| CN | 105308880 A | 2/2016 |
| CN | 106454930 A | 2/2017 |
| CN | 106817157 A | 6/2017 |
| CN | 107027145 A | 8/2017 |
| WO | 2015051529 A1 | 4/2015 |
| WO | 2017028676 A1 | 2/2017 |

\* cited by examiner

US 11,211,987 B2

METHODS, APPARATUS AND SYSTEMS FOR PERFORMING CHANNEL MEASUREMENT IN A MULTI-BEAM WIRELESS COMMUNICATION NETWORK

TECHNICAL FIELD

The disclosure relates generally to wireless communications and, more particularly, to methods, apparatus and systems for performing channel measurement in a multi-beam wireless communication network.

BACKGROUND

Wireless networking systems have become a prevalent means by which a majority of people worldwide has come to communicate. A typical wireless communication network (e.g., employing frequency, time, and/or code division techniques) includes one or more base stations (typically known as a "BS") that each provides a geographical radio coverage, and one or more wireless user equipment devices (typically know as a "UE") that can transmit and receive data within the radio coverage. Such communication between the BS and UE can be degraded due to channel variations and/or interference and power variations. In this regard, the UE may use a pre-defined protocol and/or follow a higher-layer instruction to measure corresponding reference signal(s) so as to estimate channel conditions, which is typically represented as "channel state information (CSI)" that is fed back to the BS. According to the CSI report from the UE, the BS can have a better knowledge of the channels and UE ability.

In the next generation of wireless communication technology, e.g. the fifth-generation (5G) new radio (NR) network or the next generation of wireless local area network (WLAN) technology, the rate is required to be faster. Spatial multiplexing is beneficial for the deployment of dense networks, and can enhance throughput of the entire network. The introduction of multi-antenna and multi-beam is good for spatial multiplexing, and can bring more precise beamforming. But a more accurate beamforming requires more accurate channel measurement. In an existing system, e.g. a 2/5 GHz WLAN communication system, the BS transmits a CSI measurement request, e.g. a channel measurement frame, to the UE. The UE then performs channel measurement and feeds back channel information to the BS without referring to any beam information. Thus, existing systems and methods for performing channel measurement are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: transmitting a channel measurement frame based on a plurality of beams to a wireless communication device through a channel between the wireless communication node and the wireless communication device; and receiving a feedback frame from the wireless communication device. The channel measurement frame comprises a training sequence including a plurality of repetitive segments. Each of the plurality of repetitive segments is transmitted based on a respective one of the plurality of beams. The feedback frame comprises channel information of the channel with respect to at least one beam of the plurality of beams.

In a further embodiment, a method performed by a wireless communication device is disclosed. The method comprises: receiving a channel measurement frame that is transmitted by a wireless communication node based on a plurality of beams through a channel between the wireless communication device and the wireless communication node; and transmitting a feedback frame to the wireless communication node. The channel measurement frame comprises a training sequence including a plurality of repetitive segments. Each of the plurality of repetitive segments is transmitted based on a respective one of the plurality of beams. The feedback frame comprises channel information of the channel with respect to at least one beam of the plurality of beams.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
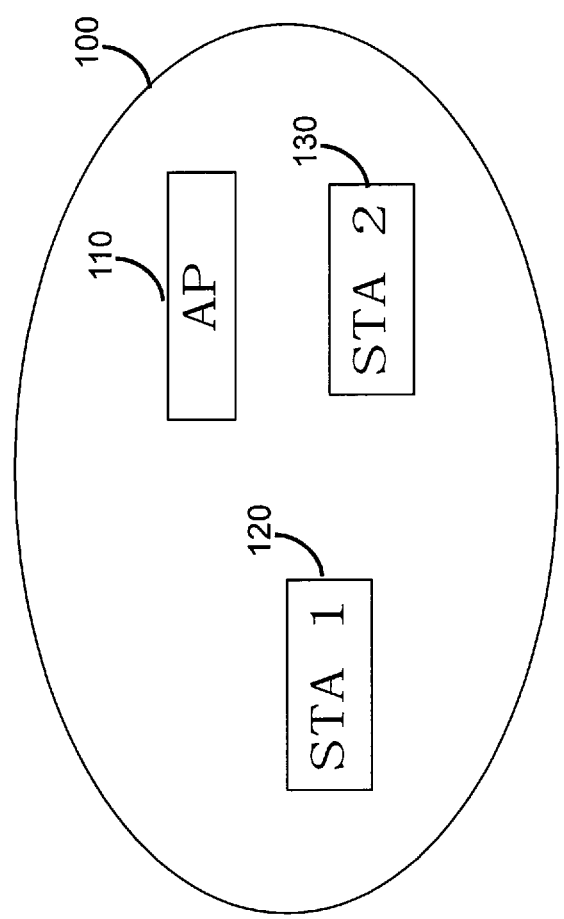
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In the next generation of wireless communication technology, e.g. the fifth-generation (5G) new radio (NR) network or the next generation of wireless local area network (LAN) technology, the rate is required to be faster. Spatial multiplexing is beneficial for the deployment of dense networks, and can enhance throughput of the entire network. The introduction of multi-antenna and multi-beam is good for spatial multiplexing, and can bring more precise beamforming. But a more accurate beamforming requires more accurate channel measurement. In an existing system, the BS transmits a channel measurement frame to the UE based on a single beam, and the UE performs channel measurement and feeds back channel information to the BS with respect to the single beam, which cannot assure an accurate channel measurement when beamforming is utilized. The present disclosure provides new methods of channel measurement and channel information feedback for enhancing system throughput and increasing the chance of spatial multiplexing.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can include, or be implemented as, a next Generation Node B (gNB), an E-UTRAN Node B (eNB), a Transmission/Reception Point (TRP), an Access Point (AP), etc.; while a UE in the present disclosure can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

According to some embodiments of the present disclosure, an AP or a BS transmits a channel measurement statement frame based on a multi-beam scheme. The frame is utilized for scheduling a single or a plurality of stations to prepare to receive a channel measurement frame having a multi-beam characteristic (hereinafter "multi-beam channel measurement frame") after a specific time period. AP then transmits a multi-beam channel measurement frame, which may or may not contain a data field, to multiple stations. The multiple stations use an omnidirectional receiving mode or a default receiving mode to receive the multi-beam channel measurement frame. The default receiving mode can be negotiated and agreed on between the AP and the station.

In one example, the AP sends a unicast channel measurement statement frame, and the station sends channel information as a feedback at a specific time after receiving the multi-beam channel measurement frame. In another example, the AP sends a broadcast channel measurement statement frame to schedule multiple stations to perform channel measurements. After transmitting a multi-beam channel measurement frame, the AP transmits a scheduling frame or a multi-station polling frame, to schedule the plurality of stations to transmit a channel feedback frame having specific channel feedback information.

The present disclosure provides a novel design of a multi-beam channel measurement frame. In addition, the feedback of the channel information is with respect to one or more specific beams. For example, after a channel measurement frame with 10 beams is transmitted to a station, the station generates the feedback information based on one of the ten beams that has a largest signal-to-noise ratio (SNR), e.g. beam 7. Then the channel information with respect to beam 7 is fed back to the AP. Based on methods provided in the present disclosure, a station can feed back accurate channel measurement information, to improve data transmission quality, increase the chance of multiplexing at other stations, and to improve transmission throughput of the entire network.

FIG. 1 illustrates an exemplary communication network 100 in which techniques disclosed herein may be implemented, in accordance with an embodiment of the present disclosure. As shown in FIG. 1, the exemplary communication network 100 includes an AP 110 and two stations STA1 120, STA2 130, where the AP 110 can communicate with the two stations according to some wireless protocols. In some embodiments, the AP 110 may be replaced with a BS; and each of the two stations STA1 120, STA2 130 can be replaced with a UE, without impacting the implementation of the disclosed method. In the next generation of wireless communications, especially in wireless LAN technology, the AP 110 may be equipped with a multi-antenna array to improve the data transmission rate. In one embodiment, the AP 100 may form a plurality of beams by the multi-antenna array. Each of the plurality of beams points in a distinct direction. The AP 100 can transmit a channel measurement frame based on the plurality of beams to each of the two stations STA1 120, STA2 130 for channel measurement of the channel between the AP 100 and the station.

Figure 2:
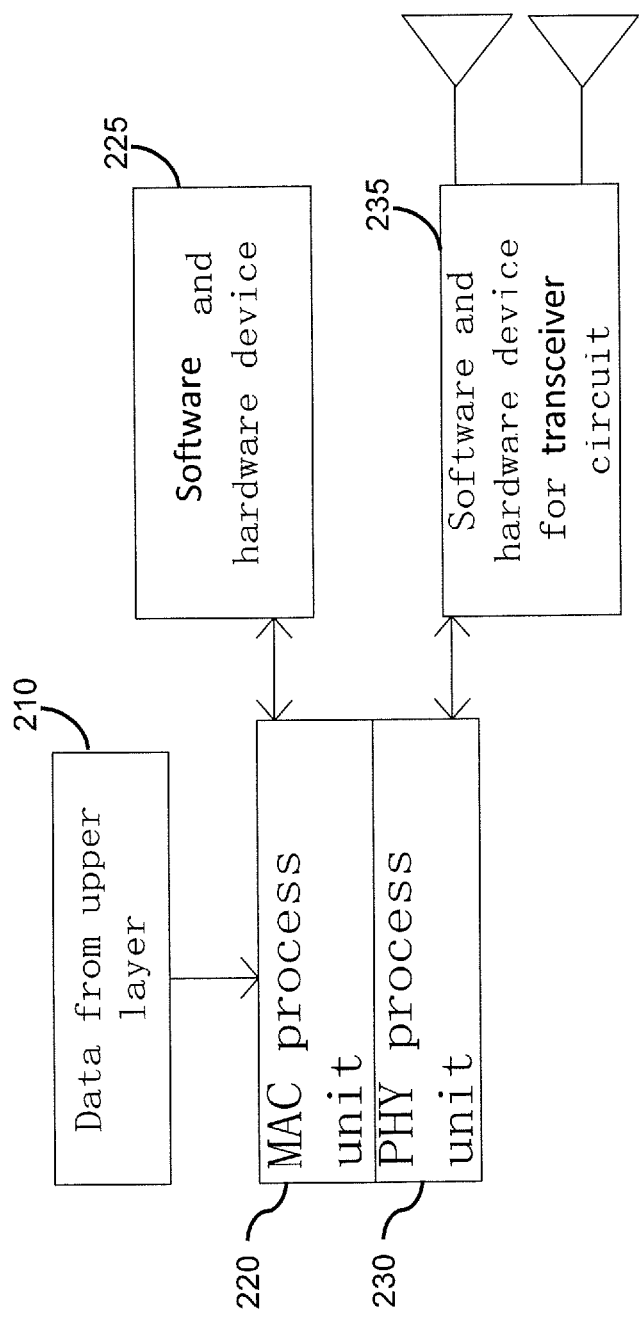
FIG. 2 illustrates an exemplary data processing before data transmission at a transmitting terminal, in accordance with an embodiment of the present disclosure.

FIG. 2 illustrates an exemplary data processing before data transmission at a transmitting terminal, e.g. the AP 100 as shown in FIG. 1, in accordance with an embodiment of the present disclosure. As shown in FIG. 2, the media access control (MAC) process unit 220 at the MAC layer of the transmitting terminal receives the data 210 from the upper layer. The MAC process unit 220 may form a frame through the software and corresponding hardware device 225 at the transmitting terminal. The MAC process unit 220 may add an appropriate frame header information to the data (i.e. the frame here), and transmit the data to the physical (PHY) process unit 230 at the PHY layer through the interaction with the PHY layer. In the PHY layer, signal is sent through the software and the corresponding hardware circuit 235 to complete the transmission of the PHY layer PPDU (Physical Packet Data Unit).

Figure 3:
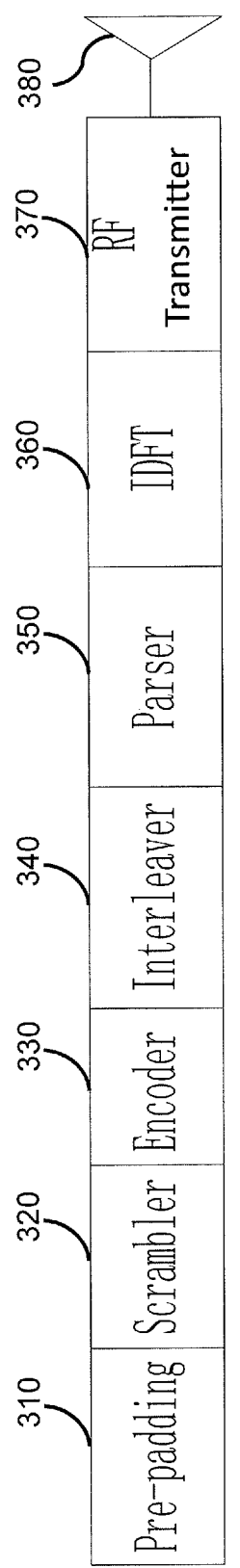
FIG. 3 illustrates an exemplary data processing at a physical layer of a transmitting terminal before data transmission, in accordance with an embodiment of the present disclosure.

FIG. 3 illustrates an exemplary data processing at a physical layer of a transmitting terminal before data transmission, in accordance with an embodiment of the present disclosure. In one embodiment, a signal is processed and transmitted at the PHY layer based on the process illustrated in FIG. 3. As shown in FIG. 3, a PHY layer signal including information bits is pre-padded by a pre-padding unit 310 to add some padding bits; passes a scrambler 320 for scrambling the information bit stream to reduce an occurrence of long sequences of ones or zeros; and is encoded by an encoder 330 to generate coded bits. The coded bits are then interleaved by an interleaver 340 to prevent long sequences of adjacent noisy bits from entering a decoder at the receiver. A parser 350 may parse the one or more encoded streams into one or more spatial streams. An inverse discrete Fourier transform (IDFT) unit 360 can perform an inverse discrete Fourier transform to convert a block of constellation points to time-domain digital signals. A radio frequency (RF) transmitter 370 then converts the digital signals to analog signals and up-converts the signals to RF frequencies for transmission via an antenna 380. It can be understood that the above process described with respect to FIG. 3 will be reversed for the signal to be received at the receiver, e.g. a station or a UE.

Figure 4:
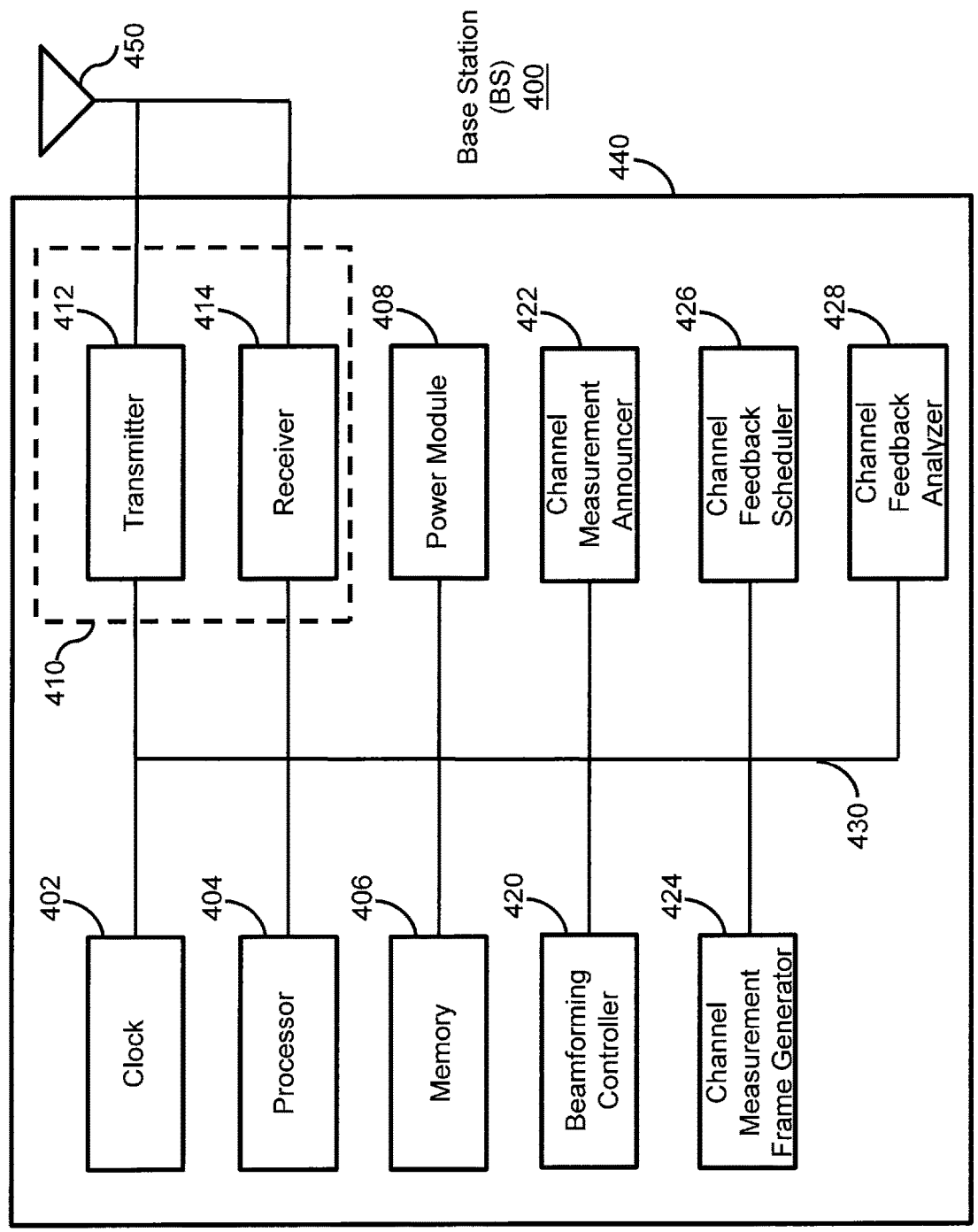
FIG. 4 illustrates a block diagram of a base station (BS), in accordance with some embodiments of the present disclosure.

FIG. 4 illustrates a block diagram of a base station (BS) 400, in accordance with some embodiments of the present disclosure. The BS 400 is an example of a device that can be configured to implement the various methods described herein. As shown in FIG. 4, the BS 400 includes a housing 440 containing a system clock 402, a processor 404, a memory 406, a transceiver 410 comprising a transmitter 412 and receiver 414, a power module 408, a beamforming controller 420, a channel measurement announcer 422, a channel measurement frame generator 424, a channel feedback scheduler 426, and a channel feedback analyzer 428.

In this embodiment, the system clock 402 provides the timing signals to the processor 404 for controlling the timing of all operations of the BS 400. The processor 404 controls the general operation of the BS 400 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 406, which can include both read-only memory (ROM) and random access memory (RAM), can provide instructions and data to the processor 404. A portion of the memory 406 can also include non-volatile random access memory (NVRAM). The processor 404 typically performs logical and arithmetic operations based on program instructions stored within the memory 406. The instructions (a.k.a., software) stored in the memory 406 can be executed by the processor 404 to perform the methods described herein. The processor 404 and memory 406 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 410, which includes the transmitter 412 and receiver 414, allows the BS 400 to transmit and receive data to and from a remote device (e.g., the BS or another UE). An antenna 450 is typically attached to the housing 440 and electrically coupled to the transceiver 410. In various embodiments, the BS 400 includes (not shown) multiple transmitters, multiple receivers, and multiple transceivers. In one embodiment, the antenna 450 is replaced with a multi-antenna array 450 that can form a plurality of beams each of which points in a distinct direction. The transmitter 412 can be configured to wirelessly transmit packets having different packet types or functions, such packets being generated by the processor 404. Similarly, the receiver 414 is configured to receive packets having different packet types or functions, and the processor 404 is configured to process packets of a plurality of different packet types. For example, the processor 404 can be configured to determine the type of packet and to process the packet and/or fields of the packet accordingly.

In a wireless communication, the BS 400 may schedule a UE to perform channel measurement on a channel between the BS 400 and the UE. The beamforming controller 420 in this example controls and adjusts phases of signals to be transmitted with respect to the antennas in the multi-antenna array 450 to form different directional signal or beam transmissions. Based on beamforming, the beamforming controller 420 can form a plurality of beams by the multi-antenna array 450 on the BS 400, where each of the plurality of beams points in a distinct direction. Each beam may be used to transmit, via the transmitter 412, a frame or a portion of a frame by the BS 400.

The channel measurement announcer 422 in this example generates and transmits, via the transmitter 412, a channel measurement announcement frame to the UE to initiate a channel measurement process. In one embodiment, the channel measurement announcement frame may indicate a channel measurement frame is to be transmitted based on an omnidirectional mode. In another embodiment, the channel measurement announcement frame may indicate a channel measurement frame is to be transmitted based on a plurality of beams and the number of beams to be used in the channel measurement frame.

According to various embodiments, the channel measurement announcement frame may be transmitted based on an omnidirectional mode via unicast packet to one UE or via broadcast a plurality of UEs. For unicast, the channel measurement announcement frame can inform the UE to perform channel measurement based on a channel measurement frame to be transmitted later. For broadcast, the channel measurement announcement frame can inform the plurality of UEs to perform channel measurements based on a channel measurement frame to be transmitted later.

The channel measurement frame generator 424 in this example generates and transmits, via the transmitter 412, a channel measurement frame based on the plurality of beams formed by the beamforming controller 420 to a UE through a channel between the UE and the BS 400. In one embodiment, the channel measurement frame comprises a training sequence including a plurality of repetitive segments. Each of the plurality of repetitive segments may be transmitted based on a respective one of the plurality of beams. Each of the plurality of repetitive segments includes a first training field to be utilized for channel measurement and/or a second training field to be utilized for automatic gain control. In one embodiment, the channel measurement frame comprises a preamble that is transmitted based on an omnidirectional mode. The preamble may include at least one of: a legacy training field; a legacy signal field; a non-legacy training field; and a non-legacy signal field.

The channel feedback scheduler 426 in this example generates and transmits, via the transmitter 412, a channel feedback scheduling frame to the plurality of UEs to schedule the UEs for channel measurement and feedback. The channel feedback scheduling frame may comprise at least one of: a feedback trigger frame configured for triggering the plurality of UEs to transmit feedback frames to the BS 400 at the same time; and a feedback polling frame configured for scheduling the plurality of UEs to transmit feedback frames to the BS 400 in turn upon the polling.

The channel feedback analyzer 428 in this example may receive, via the receiver 414, a feedback frame from the UE and analyze the feedback frame. The feedback frame comprises channel information of the channel with respect to at least one beam of the plurality of beams. The at least one beam may be determined by the UE based on a signal-to-noise ratio (SNR) at an output of the channel corresponding to each of the plurality of beams. For example, the UE may select one or more beams with top SNRs and transmit a feedback of the channel information with respect to the one or more beams to the BS 400. In one embodiment, the SNR corresponding to a beam is an average SNR across multiple space-time streams on the beam over a bandwidth of a resource block of the beam.

In one embodiment, the feedback frame is transmitted by the UE based on an omnidirectional mode. In one embodiment, the feedback frame further comprises information about at least one of: a beam identification for each of the at least one beam; the SNR corresponding to each of the at least one beam; and a channel quality indication for the channel with respect to each of the at least one beam.

In one embodiment, after the UE selects multiple beams and transmits the channel information feedback with respect to the multiple beams to the BS 400, the beamforming controller 420 may regenerate a refined set of beams based on the multiple beams and retransmit, via the transmitter 412, the channel measurement frame based on the refined set of beams. As such, the UE can perform a refined channel measurement and select one beam having the highest SNR among the refined set of beams.

After the channel feedback analyzer 428 analyzes and determines the at least one beam selected by the UE, the BS 400 transmits, via the transmitter 412, data to the UE through the channel based on the at least one beam. In this manner, the BS 400 focuses its transmission power during data transmission to the effective beam(s) selected by the UE based on an accurate channel measurement.

The power module 408 can include a power source such as one or more batteries, and a power regulator, to provide regulated power to each of the above-described modules in FIG. 4. In some embodiments, if the BS 400 is coupled to a dedicated external power source (e.g., a wall electrical outlet), the power module 408 can include a transformer and a power regulator.

The various modules discussed above are coupled together by a bus system 430. The bus system 430 can include a data bus and, for example, a power bus, a control signal bus, and/or a status signal bus in addition to the data bus. It is understood that the modules of the BS 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the channel feedback analyzer 428. Conversely, each of the modules illustrated in FIG. 4 can be implemented using a plurality of separate components or elements.

Figure 5:
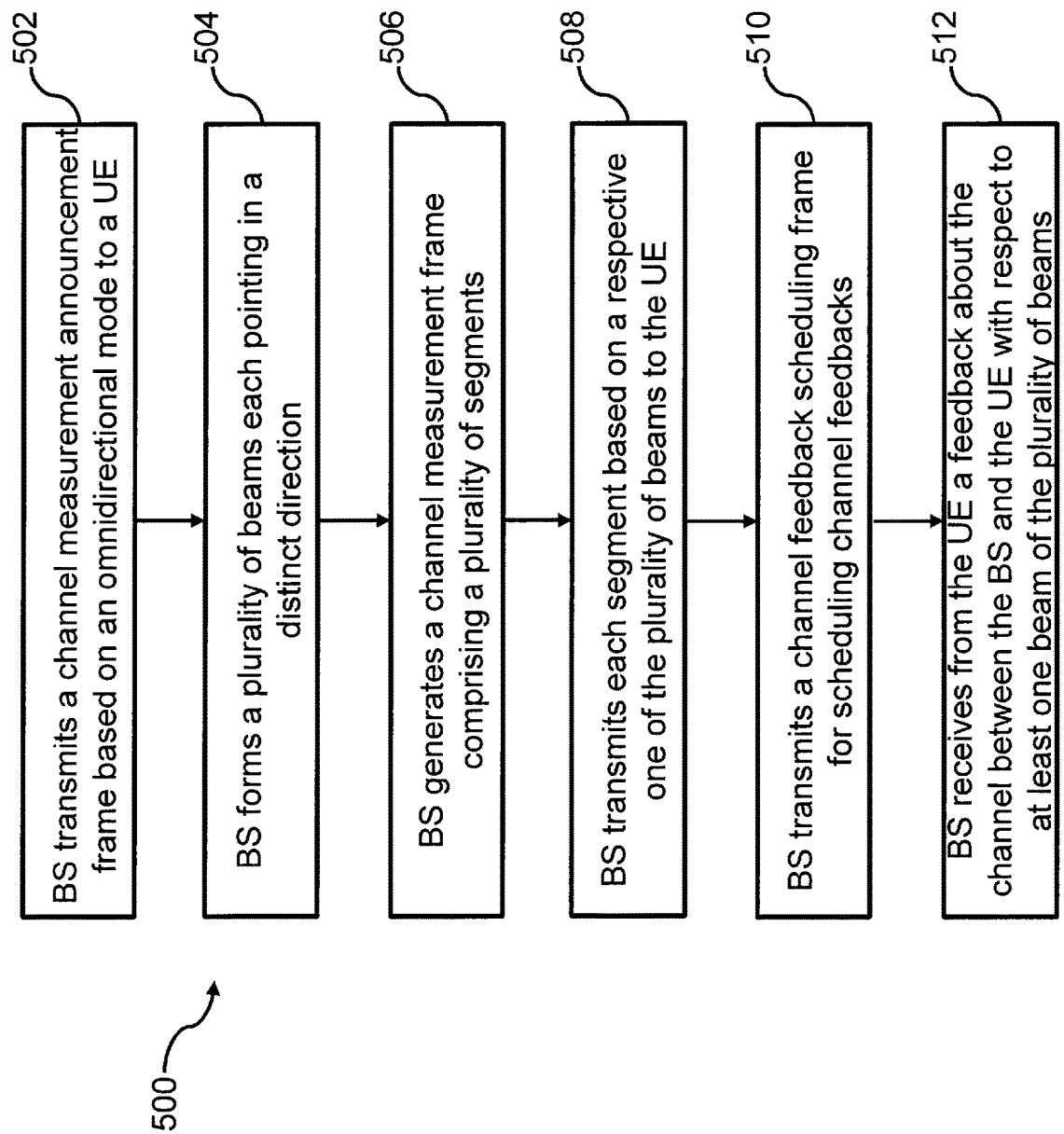
FIG. 5 illustrates a flow chart for a method performed by a BS for channel measurement in a multi-beam wireless communication, in accordance with some embodiments of the present disclosure.

FIG. 5 illustrates a flow chart for a method 500 performed by a BS, e.g. the BS 400 in FIG. 4, for channel measurement in a multi-beam wireless communication, in accordance with some embodiments of the present disclosure. At operation 502, the BS transmits a channel measurement announcement frame based on an omnidirectional mode to a UE. The BS forms at operation 504 a plurality of beams each pointing in a distinct direction. The BS generates at operation 506 a channel measurement frame comprising a plurality of segments. The BS transmits at operation 508 each segment based on a respective one of the plurality of beams to the UE. The BS transmits at operation 510 a channel feedback scheduling frame for scheduling channel feedbacks. Then at operation 512, the BS receives from the UE a feedback about the channel between the BS and the UE with respect to at least one beam of the plurality of beams.

Figure 6:
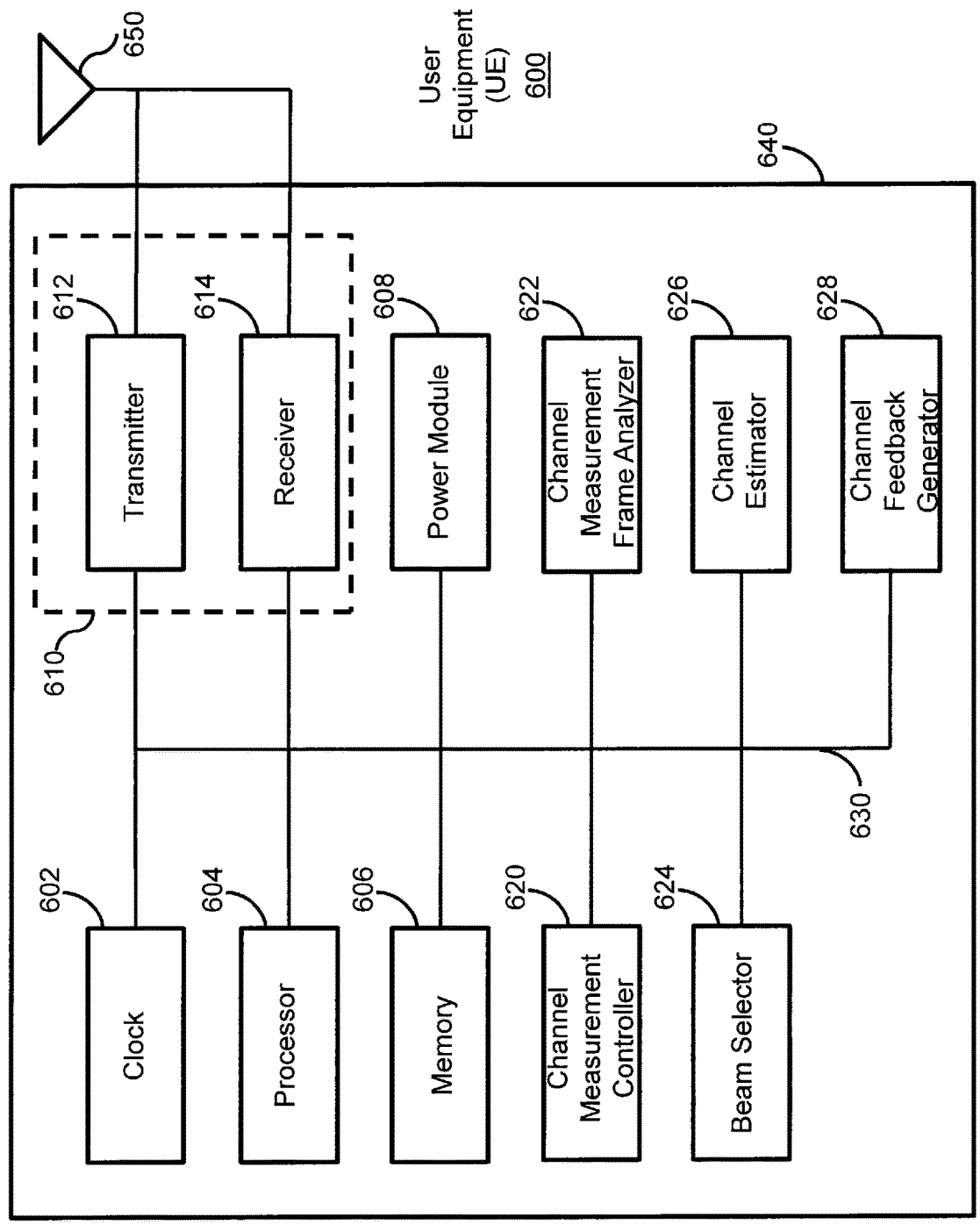
FIG. 6 illustrates a block diagram of a user equipment (UE), in accordance with some embodiments of the present disclosure.

FIG. 6 illustrates a block diagram of a UE 600, in accordance with some embodiments of the present disclosure. The UE 600 is an example of a device that can be configured to implement the various methods described herein. As shown in FIG. 6, the UE 600 includes a housing 640 containing a system clock 602, a processor 604, a memory 606, a transceiver 610 comprising a transmitter 612 and a receiver 614, a power module 608, a channel measurement controller 620, a channel measurement frame analyzer 622, a beam selector 624, a channel estimator 626, and a channel feedback generator 628.

In this embodiment, the system clock 602, the processor 604, the memory 606, the transceiver 610 and the power module 608 work similarly to the system clock 402, the processor 404, the memory 406, the transceiver 410 and the power module 408 in the BS 400. An antenna 650 or a multi-antenna array 650 is typically attached to the housing 640 and electrically coupled to the transceiver 610.

The channel measurement controller 620 may receive, via the receiver 614, from a BS, e.g. the BS 400, a channel measurement announcement frame that is used to initiate a channel measurement process at the UE 600. In one embodiment, the channel measurement announcement frame may indicate a channel measurement frame is to be transmitted by the BS based on an omnidirectional mode. In another embodiment, the channel measurement announcement frame may indicate a channel measurement frame is to be transmitted by the BS based on a plurality of beams and indicate the number of beams to be used in the channel measurement frame.

According to various embodiments, the channel measurement announcement frame may be transmitted by the BS based on an omnidirectional mode via unicast packet to the UE 600 or via broadcast a plurality of UEs including the UE 600. For unicast, the channel measurement announcement frame can inform the UE 600 to perform channel measurement based on a channel measurement frame to be transmitted later. For broadcast, the channel measurement announcement frame can inform the plurality of UEs to perform channel measurements based on a channel measurement frame to be transmitted later.

The channel measurement frame analyzer 622 in this example receives a channel measurement frame that is transmitted by the BS based on a plurality of beams through a channel between the BS and the UE, and analyzes the channel measurement frame. In one embodiment, the channel measurement frame comprises a training sequence including a plurality of repetitive segments, and each of the plurality of repetitive segments is transmitted based on a respective one of the plurality of beams. In one embodiment, each of the plurality of repetitive segments includes a first training field to be utilized for channel measurement and/or a second training field to be utilized for automatic gain control. In one embodiment, the channel measurement frame comprises a preamble that is transmitted based on an omnidirectional mode. The preamble may include at least one of: a legacy training field; a legacy signal field; a non-legacy training field; and a non-legacy signal field.

As discussed above, the channel measurement frame is transmitted by the BS based on a plurality of beams. The plurality of beams may be formed by a multi-antenna array on the BS. Each of the plurality of beams points in a distinct direction.

Among the plurality of beams, the beam selector 624 may determine or select at least one beam based on an SNR at an output of the channel with respect to each of the plurality of beams. For example, the beam selector 624 may select one or more beams with highest SNRs. In one embodiment, the SNR corresponding to a beam is an average SNR across multiple space-time streams on the beam over a bandwidth of a resource block of the beam.

The channel estimator 626 in this example performs channel measurement on the channel based on the channel measurement frame to determine the channel information with respect to the at least one beam. Based on the measured channel information, the channel feedback generator 628 generates a channel feedback, e.g. a feedback frame, and transmits, via the transmitter 612, the feedback frame to the BS based on an omnidirectional mode. The feedback frame comprises channel information of the channel with respect to the at least one beam selected by the beam selector 624.

In one embodiment, the feedback frame further comprises information about at least one of: a beam identification for each of the at least one beam; the SNR corresponding to each of the at least one beam; and a channel quality indication for the channel with respect to each of the at least one beam.

In one embodiment, the channel feedback generator 628 transmits, via the transmitter 612, the feedback frame to the BS upon receiving, via the receiver 614, a channel feedback scheduling frame transmitted by the BS to a plurality of UEs including the UE 600. The channel feedback scheduling frame may comprise at least one of: a feedback trigger frame configured for triggering the plurality of UEs to transmit feedback frames to the BS at the same time; and a feedback polling frame configured for scheduling the plurality of UEs to transmit feedback frames to the BS in turn upon the polling.

In one embodiment, after the UE 600 selects multiple beams and transmits the channel information feedback with respect to the multiple beams to the BS, the BS may regenerate a refined set of beams based on the multiple beams and retransmit the channel measurement frame based on the refined set of beams. As such, the UE 600 can perform a refined channel measurement and select one beam having the highest SNR among the refined set of beams for channel information feedback. After the channel information feedback, the UE 600 may receive, via the receiver 614, data from the BS through the channel based on the at least one beam, such that the BS can effectively focus its transmission power during data transmission to the beam(s) selected by the UE 600 based on an accurate channel measurement.

The various modules discussed above are coupled together by a bus system 630. The bus system 630 can include a data bus and, for example, a power bus, a control signal bus, and/or a status signal bus in addition to the data bus. It is understood that the modules of the UE 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 604 can implement not only the functionality described above with respect to the processor 604, but also implement the functionality described above with respect to the channel measurement frame analyzer 622. Conversely, each of the modules illustrated in FIG. 6 can be implemented using a plurality of separate components or elements.

Figure 7:
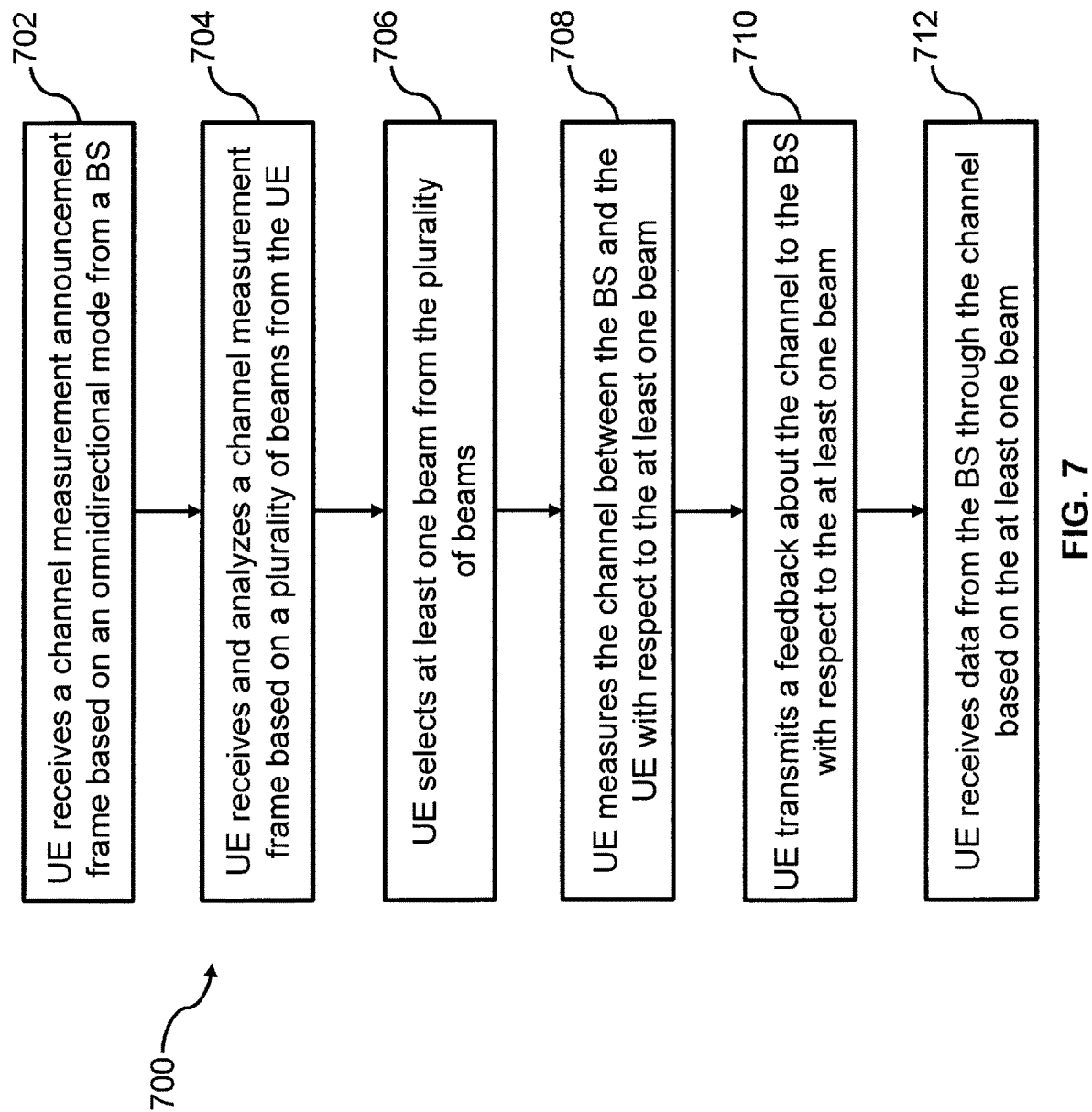
FIG. 7 illustrates a flow chart for a method performed by a UE for performing channel measurement in a multi-beam wireless communication, in accordance with some embodiments of the present disclosure.

FIG. 7 illustrates a flow chart for a method 700 performed by a UE, e.g. the UE 600 in FIG. 6, for performing channel measurement in a multi-beam wireless communication, in accordance with some embodiments of the present disclosure. At operation 702, the UE receives a channel measurement announcement frame based on an omnidirectional mode from a BS. At operation 704, the UE receives and analyzes a channel measurement frame based on a plurality of beams from the UE. The UE selects at operation 706 at least one beam from the plurality of beams. The UE measures at operation 708 the channel between the BS and the UE with respect to the at least one beam. The UE transmits at operation 710 a feedback about the channel to the BS with respect to the at least one beam. The UE receives at operation 712 data from the BS through the channel based on the at least one beam.

Different embodiments of the present disclosure will now be described in detail hereinafter. It is noted that the features of the embodiments and examples in the present disclosure may be combined with each other in any manner without conflict.

In a first embodiment, a BS schedules a UE to perform channel measurement. The BS transmits a channel measurement announcement frame to initiate a channel measurement process, and indicates, via a 1-bit indication, whether the channel measurement uses a multi-beam channel measurement mode or an omnidirectional mode for transmission. In one example, as shown in FIG. 8, the BS is an AP, and the UE is a station STA1.

Figure 8:
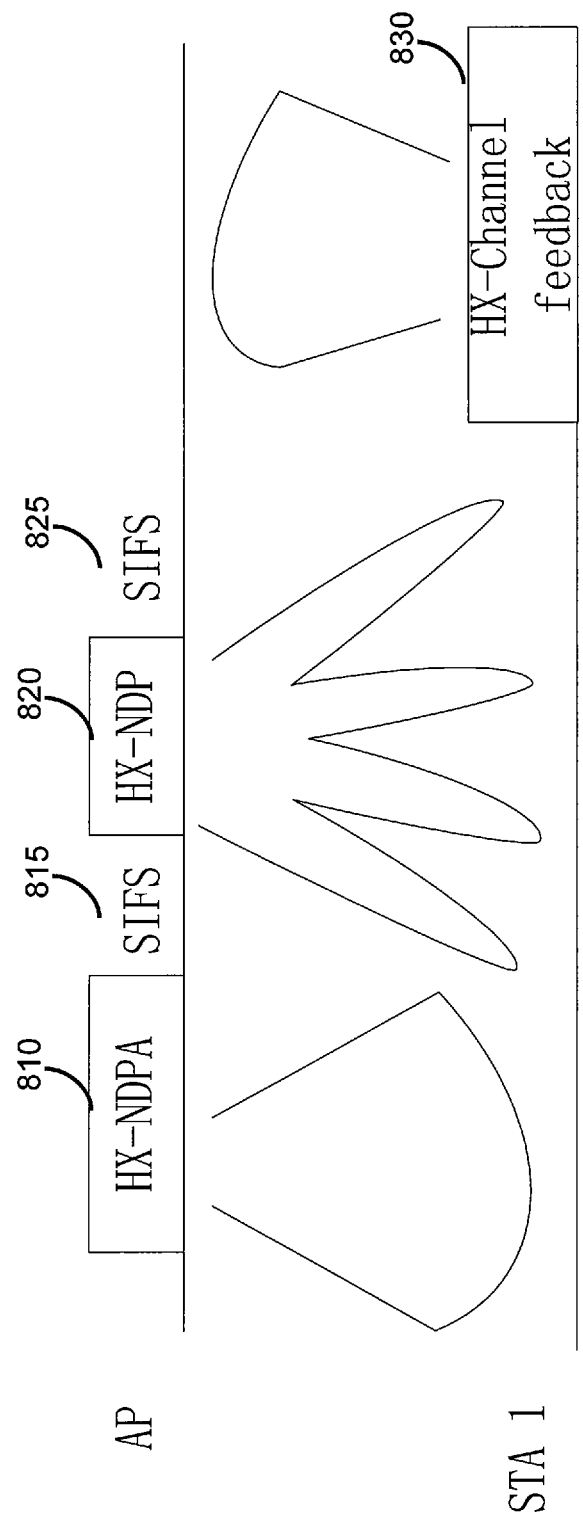
FIG. 8 illustrates an exemplary process of performing channel measurement in a multi-beam wireless communication, in accordance with some embodiments of the present disclosure.

FIG. 8 illustrates an exemplary process of performing channel measurement in a multi-beam wireless communication, in accordance with some embodiments of the present disclosure. In this example, the AP schedules station STA1 to perform channel measurement, and the AP transmits a channel measurement announcement frame to initiate a channel measurement process. In one example, the channel measurement announcement frame may be an HX-NDPA (high X null data packet announcement) frame 810. The channel measurement announcement frame is transmitted via the omnidirectional mode. In the present embodiment, the AP sends a unicast channel measurement announcement frame, i.e. sends to a single station STA1. In this embodiment, the channel measurement announcement frame has a 1-bit indication that indicates the subsequent transmission of the channel measurement frame uses the multi-beam transmission mode. In the example shown in FIG. 8, the channel measurement frame is an HX-NDP (high X null data packet) frame 820. The channel measurement announcement frame also instructs that the receiving station STA1, after receiving the channel measurement frame, feeds back the channel information, the identification of the selected beam, and the corresponding SNR, via a channel feedback frame 830.

Figure 9:
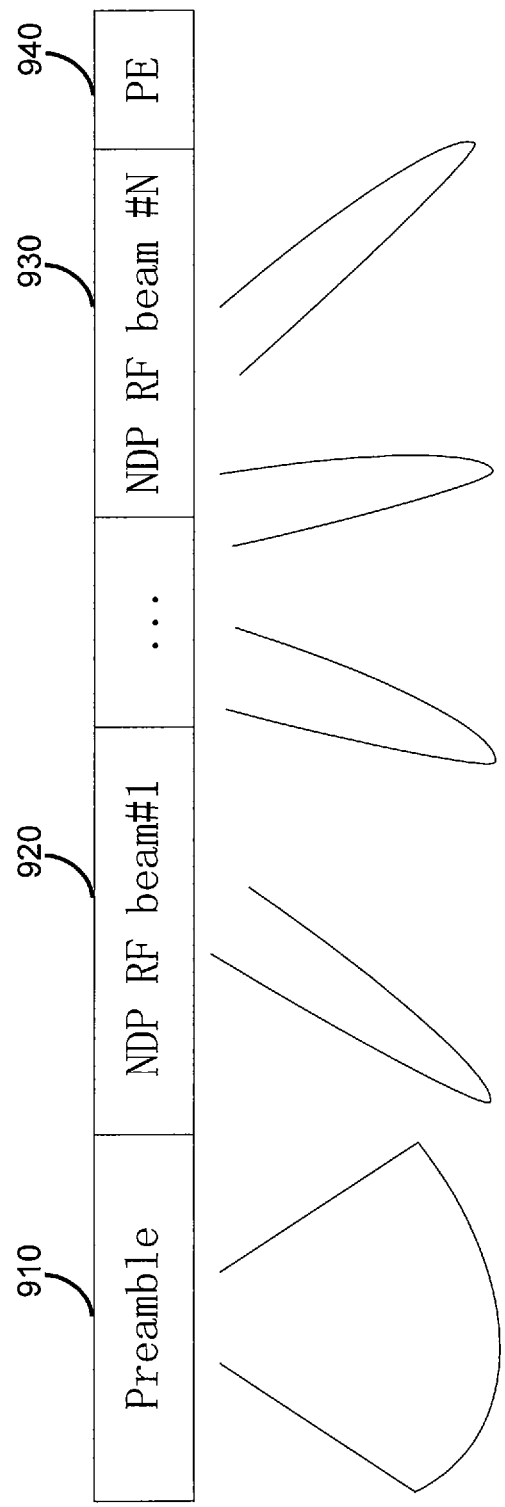
FIG. 9 illustrates an exemplary structure of a null data packet (NDP) frame, in accordance with some embodiments of the present disclosure.

After the AP transmits the unicast channel measurement announcement frame 810, the AP transmits the channel measurement frame 820 with the multi-beam characteristic to the STA1. In the example shown in FIG. 8, the channel measurement frame 820 is transmitted at a certain time interval 815, e.g. a short inter frame slot (SIFS), after the transmission of the channel measurement announcement frame 810. FIG. 9 illustrates an exemplary structure of a null data packet (NDP) frame, e.g. the HX-NDP frame 820 in FIG. 8, in accordance with some embodiments of the present disclosure. As shown in FIG. 9, the NDP frame includes a preamble field 910, the fields of NDP radio frequency (RF) beam # n (1<=n<=N) 920, 930, and a packet extension (PE) field 940. In one example, the preamble field 910 may contain the traditional fields, e.g. a legacy short training field (L-STF), a legacy long training field (L-LTF), a legacy signal field (L-SIG), etc. that are compatible with traditional devices, and a non-legacy signal field HX-SIG-A. The PE field 940 is added at the end of the frame. The PE field is for packet or frame extension, such that the receiver has enough time for data analysis.

Figure 10:
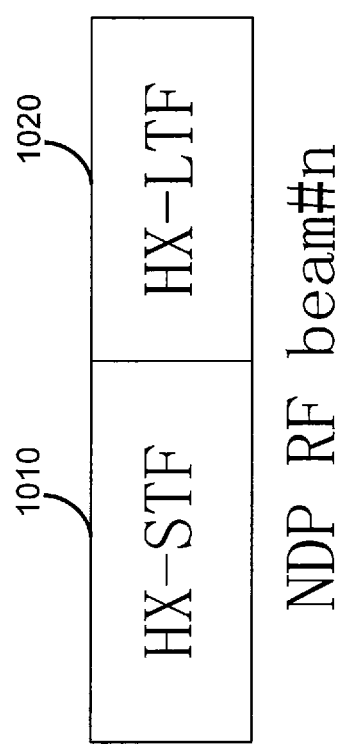
FIG. 10 illustrates an exemplary structure of a field in an NDP frame, in accordance with some embodiments of the present disclosure.

FIG. 10 illustrates an exemplary structure of a field of NDP RF beam # n (1<=n<=N) in an NDP frame, in accordance with some embodiments of the present disclosure. In this example, the field of NDP RF beam # n (1<=n<=N) includes two non-legacy training fields: a high X short training field (HX-STF) 1010 that is used for automatic gain control (AGC) and a high X long training field (HX-LTF) 1020 that is used for channel measurement.

The AP transmits the same training information in turn by multiple beams according to its own antenna configuration. In this embodiment, each beam is transmitted using a different antenna pattern. But all beams contain the same fields, i.e. all fields of NDP RF beam # n (1<=n<=N) 920, 930 include the same HX-STF 1010 and same HX-LTF 1020.

Referring back to FIG. 8, after receiving the unicast channel measurement announcement frame 810, the station STA1 receives the channel measurement frame 820 with the multi-beam characteristic at a certain time interval SIFS 815, and feeds back the channel measurement information at a certain time interval SIFS 825. The time intervals SIFS 815, 825 may be any value, including zero, that is agreed on by the AP and the STA1. The channel measurement information includes information about SNRs and channel matrices corresponding to the beams having the highest SNRs, such as one or more of: SNR, delta SNR, channel feedback matrix, CQI (channel quantity indication), etc.

In this embodiment, the station STA1 receives the frames from the AP via an omnidirectional antenna mode. The station STA1 transmits via the omnidirectional antenna mode when transmitting the channel feedback frame. The AP receives frames from STA1 via the omnidirectional antenna mode.

Figure 11:
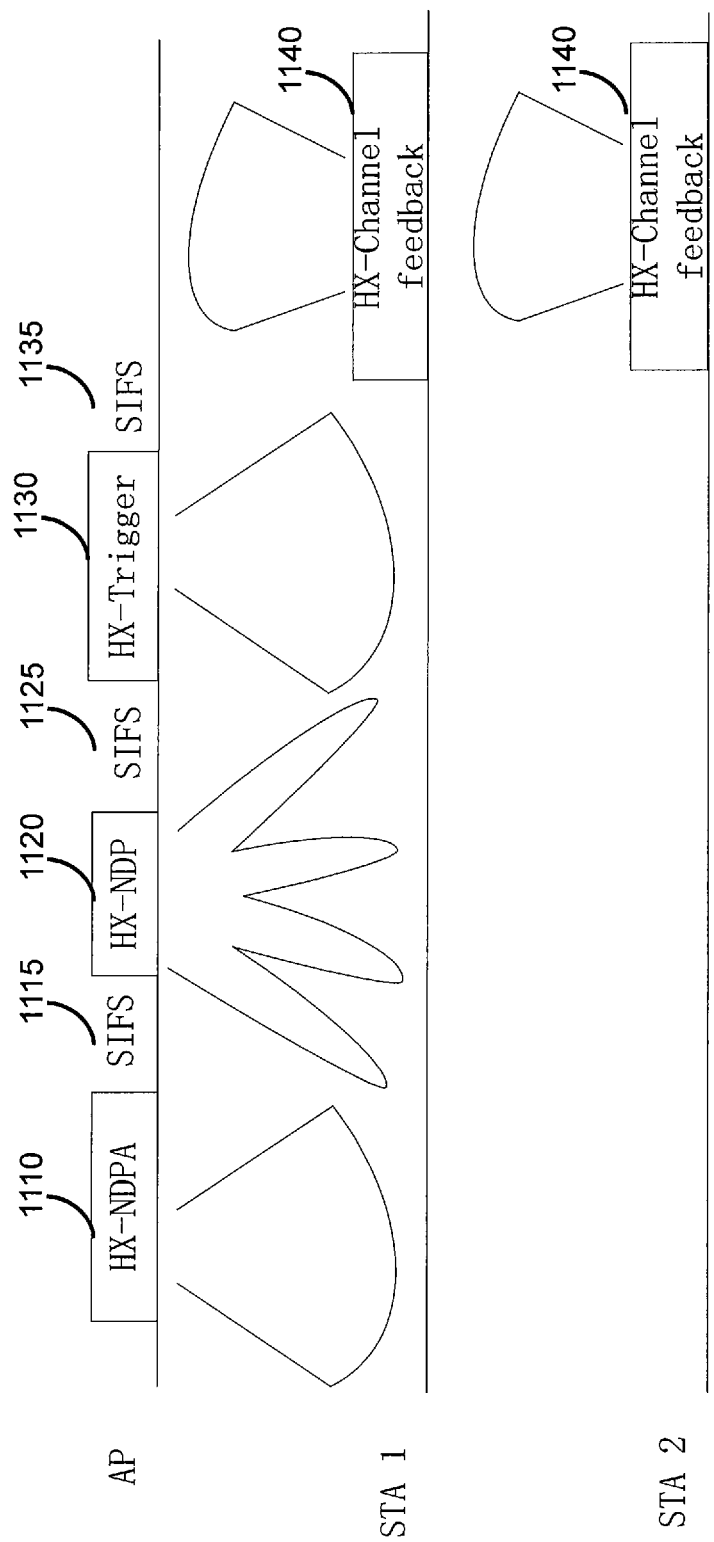
FIG. 11 illustrates another exemplary process of performing channel measurement in a multi-beam wireless communication, in accordance with some embodiments of the present disclosure.

In a second embodiment, the AP configured with a multi-antenna array performs communications with multiple stations. FIG. 11 illustrates an exemplary process of performing channel measurements by multiple stations in a multi-beam wireless communication, in accordance with some embodiments of the present disclosure including the second embodiment. According to the second embodiment, in a wireless network, e.g. a WLAN network, the AP initiates the channel measurement process by transmitting a channel measurement announcement frame 1110, e.g. an HX-NDPA frame to multiple stations, e.g. STA1 and STA2. The AP configures the channel measurement announcement frame 1110 as a broadcast frame. The channel measurement announcement frame may carry the type of channel information to be fed back by the multiple stations, including the number of the feedback space-time streams, the bandwidth of the resource block, etc. In particular, the channel measurement announcement frame 1110 includes a 1-bit indication indicating whether the subsequent channel measurement frame 1120 is to be transmitted in the omnidirectional mode or the multi-beam mode. For example, the 1-bit indication is set to 0 to indicate that the channel measurement frame 1120 is to be transmitted in the omnidirectional antenna mode, and set to 1 to indicate that the channel measurement frame 1120 is to be transmitted with a multi-beam mode. When the multi-beam mode is used, the channel measurement announcement frame 1110 further indicates the number of beams used for transmitting the channel measurement frame.

In this embodiment, the channel measurement announcement frame 1110 indicates that the subsequent channel measurement frame 1120 is to be transmitted with the multi-beam mode, where the number of the channel measurement frame 1120 radio beams is N. In the example shown in FIG. 11, the AP transmits the channel measurement frame 1120 at a specific time SIFS 1115 after the channel measurement announcement frame 1110 is transmitted. Then, the AP transmits a channel feedback scheduling frame 1130, e.g. a feedback trigger frame HX-Trigger, at a certain time SIFS 1125 after sending the channel measurement frame 1120, to schedule the stations STA1 and STA2 to feedback channel information. In this embodiment, the channel feedback scheduling frame 1130 is a feedback trigger frame HX-Trigger that is configured for triggering the multiple stations to transmit feedback frames to the AP at the same time. After receiving the feedback trigger frame 1130, the multiple stations including STA1 and STA2 transmit the channel information to the AP via a feedback frame, including the channel information matrix, the corresponding SNR, and especially the corresponding beam information. Each station selects good beam(s) based on channel measurement, among the multiple beams, to feed back the corresponding channel information.

In this embodiment, the multi-beam channel measurement frame 1120 has a structure same as that shown in FIG. 9, where the channel measurement frame 1120 includes a preamble field 910, the fields of NDP radio frequency (RF) beam # n (1<=n<=N) 920, 930, and a packet extension (PE) field 940. In one example, the preamble field 910 may contain the legacy fields, e.g. a legacy short training field (L-STF), a legacy long training field (L-LTF), a legacy signal field (L-SIG), etc. that are compatible with traditional devices, and a non-legacy signal field HX-SIG-A. The PE field 940 is added at the end of the frame for packet or frame extension, such that the receiver has enough time for data analysis.

In this embodiment, the field of NDP RF beam # n (1<=n<=N) in the channel measurement frame 1120 has a structure same as that shown in FIG. 10, where the field of NDP RF beam # n (1<=n<=N) includes two non-legacy training fields: a high X short training field (HX-STF) 1010 that is used for automatic gain control (AGC) and a high X long training field (HX-LTF) 1020 that is used for channel measurement. The different beam sequence numbers n (1<=n<=N) represent different antenna-configured beams used for transmission.

In the above-mentioned transmission and reception process, the channel measurement announcement frame 1110, the channel measurement frame 1120, and the feedback trigger frame 1130 are transmitted in an omnidirectional or near omnidirectional antenna mode. Each of the AP, the STA1 and the STA2 uses an omnidirectional antenna or near omnidirectional antenna mode during its receiving process. As shown in FIG. 9, when sending the HX-NDP 1120, the preamble 910 is transmitted using an omnidirectional or a near omnidirectional antenna mode; and each NDP RF beam field 920, 930 is transmitted using a respective beam of the multiple beams generated by the AP. Each station, STA1 or STA2, can determine good beams based on the SNR of the different beam sequences in the received HX-NDP 1120. The feedback frame transmitted by each station includes information about SNRs and channel matrices corresponding to the beam sequences having highest SNRs, such as one or more of: SNR, delta SNR, channel feedback matrix, CQI (channel quantity indication), etc.

In a third embodiment, the AP configured with a multi-antenna array performs communications with multiple stations. The third embodiment is involved with a process of performing channel measurements by multiple stations in a multi-beam wireless communication, similar to the second embodiment as shown in FIG. 11. Similar to the second embodiment, in a wireless network, e.g. a WLAN network, the AP initiates the channel measurement process by transmitting a channel measurement announcement frame 1110, e.g. an HX-NDPA frame to multiple stations, e.g. STA1 and STA2. In this embodiment, the multi-beam channel measurement frame 1120 has a structure same as that shown in FIG. 9, where the channel measurement frame 1120 includes a preamble field 910, the fields of NDP radio frequency (RF) beam # n (1<=n<=N) 920, 930, and a packet extension (PE) field 940.

Figure 12:
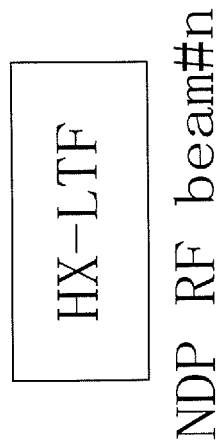
FIG. 12 illustrates another exemplary structure of a field in an NDP frame, in accordance with some embodiments of the present disclosure.

Different from the second embodiment, in the third embodiment, the preamble field 910 may contain the legacy fields like L-STF, L-LTF, L-SIG, and non-legacy fields like HX-SIG-A, HX-STF; where the NDP RF beam # n (1<=n<=N) field contains the HX-LTF that is used for channel measurement, as shown in FIG. 12. FIG. 12 illustrates an exemplary structure of the NDP RF beam # n (1<=n<=N) field in a channel measurement frame, according to the third embodiment.

Similar to the second embodiment, the different beam sequence numbers n (1<=n N) represent different antenna-configured beams used for transmission. The PE field 940 is added at the end of the frame for packet or frame extension, such that the receiver has enough time for data analysis. The transmission mode and channel feedback contents of the AP and the stations are the same as those in the second embodiment.

Figure 13:
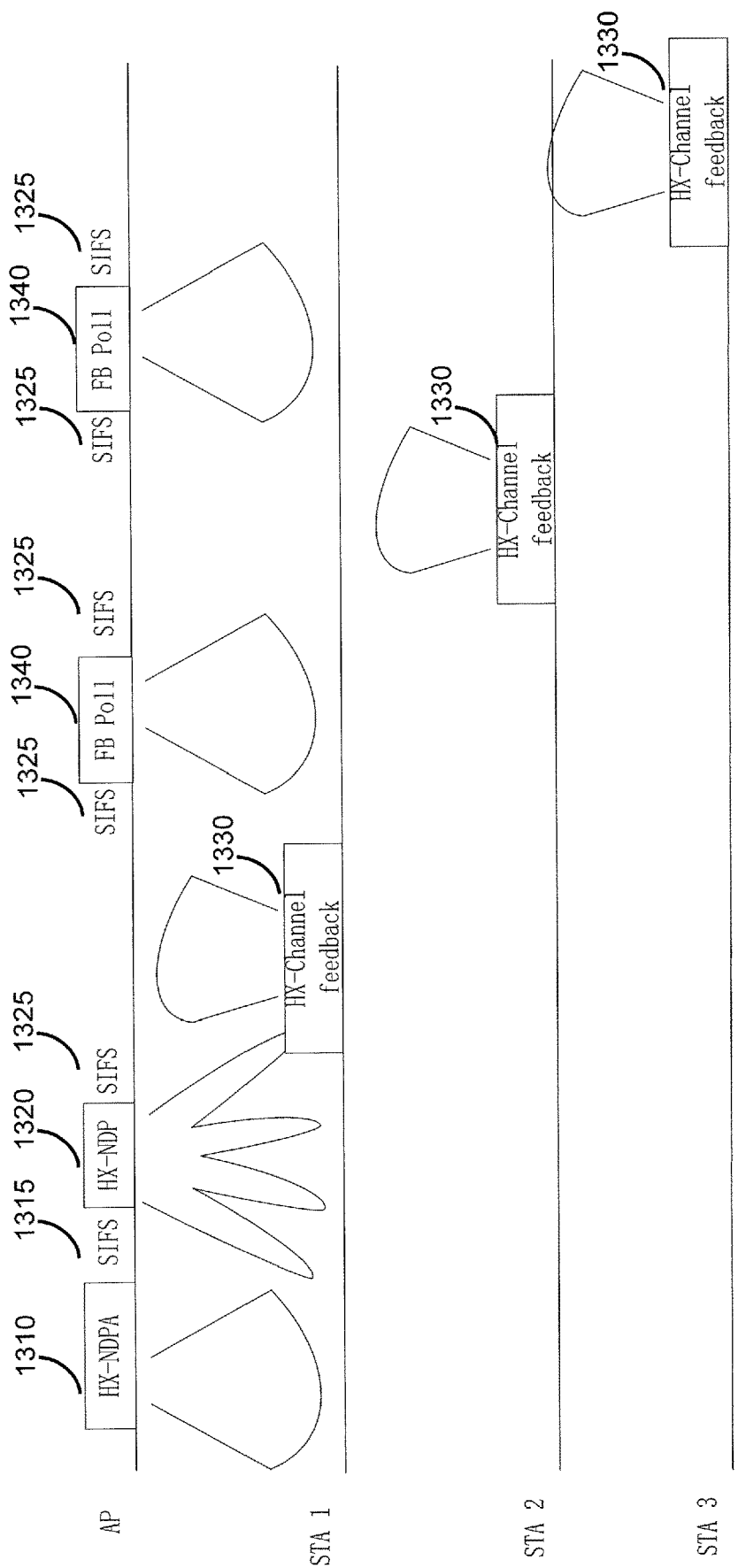
FIG. 13 illustrates a different exemplary process of performing channel measurement in a multi-beam wireless communication, in accordance with some embodiments of the present disclosure.

In a fourth embodiment, the AP configured with a multi-antenna array performs communications with multiple stations. FIG. 13 illustrates an exemplary process of performing channel measurements by multiple stations in a multi-beam wireless communication, in accordance with some embodiments of the present disclosure including the fourth embodiment. According to the fourth embodiment, in a wireless network, e.g. a WLAN network, the AP initiates the channel measurement process by transmitting a channel measurement announcement frame 1310, e.g. an HX-NDPA frame to multiple stations, e.g. STA1, STA2, STA3. The AP configures the channel measurement announcement frame 1310 as a broadcast frame. The channel measurement announcement frame may carry the type of channel information to be fed back by the multiple stations, including the number of the feedback space-time streams, the bandwidth of the resource block, etc. In particular, the channel measurement announcement frame 1310 includes an indication indicating whether the subsequent channel measurement frame 1320 is to be transmitted in the omnidirectional mode or the multi-beam mode. When the multi-beam mode is used, the channel measurement announcement frame 1310 further indicates the number of beams used for transmitting the channel measurement frame 1320.

In this embodiment, the channel measurement announcement frame 1310 indicates that the subsequent channel measurement frame 1320 is to be transmitted with the multi-beam mode, where the number of the channel measurement frame 1320 radio beams is N. In the example shown in FIG. 13, the AP transmits the channel measurement frame 1320 at a specific time SIFS 1315 after the channel measurement announcement frame 1310 is transmitted. Then, the AP transmits a channel feedback scheduling frame 1340, e.g. a feedback polling frame FB Poll, at a certain time (e.g., one or more SIFS 1325) after sending the channel measurement frame 1320, to schedule the stations STA1, STA2, STA3, to feedback channel information. In this embodiment, the channel feedback scheduling frame 1340 is a feedback polling frame FB Poll that is configured for scheduling the multiple stations to transmit feedback frames 1330 to the AP in turn. After receiving the feedback polling frame 1340, the multiple stations feedback the channel information in turn, via a feedback frame, including the channel information matrix, the corresponding SNR, and especially the corresponding beam sequence information. Each station selects good beam(s) based on channel measurement, among the multiple beams, to feed back the corresponding channel information. The feedback frame 1330 transmitted by each station includes information about SNRs and channel matrices corresponding to the beam sequences having highest SNRs, such as one or more of: SNR, delta SNR, channel feedback matrix, CQI, etc.

In one example, as shown in FIG. 13, a default station, e.g. the STA1, is scheduled to transmit feedback at the predetermined time interval SIFS 1325 after receiving the channel measurement frame 1320; while other stations are waiting for the feedback polling frame 1340 to transmit feedbacks. In another example, each station is waiting for a corresponding feedback polling frame 1340 from the AP to transmit the feedback frame to the AP.

In this embodiment, the multi-beam channel measurement frame 1320 has a structure same as that shown in FIG. 9. In this embodiment, the field of NDP RF beam # n (1<=n<=N) in the channel measurement frame 1320 has a structure same as that shown in FIG. 10 or FIG. 12. The different beam sequence numbers n (1<=n<=N) represent different antenna-configured beams used for transmission.

In this embodiment, the AP transmits the channel measurement frame 1320 using the multi-beam mode, and transmits other data frames based on the omnidirectional mode. Each feedback frame is transmitted by a station using the omnidirectional mode. The AP and the stations use the omnidirectional mode to receive frames.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, the method comprising:
   transmitting a channel measurement frame based on a plurality of beams to a wireless communication device through a channel between the wireless communication node and the wireless communication device, wherein the channel measurement frame comprises a training sequence including a plurality of repetitive segments, and each of the plurality of repetitive segments is transmitted based on a respective one of the plurality of beams; and
   receiving a feedback frame from the wireless communication device, wherein the feedback frame comprises channel information of the channel with respect to at least one beam of the plurality of beams; and
   transmitting a channel measurement announcement frame via unicast packet to the wireless communication device before transmitting the channel measurement frame, wherein the channel measurement announcement frame is transmitted based on an omnidirectional mode and informs the wireless communication device to perform channel measurement based on the channel measurement frame, wherein the channel measurement announcement frame indicates the channel measurement frame is to be transmitted based on an omnidirectional mode.

2. The method of claim 1, further comprising forming the plurality of beams by a multi-antenna array on the wireless communication node, wherein each of the plurality of beams points in a distinct direction.

3. The method of claim 1, wherein each of the plurality of repetitive segments includes
   a first training field to be utilized for channel measurement.

4. The method of claim 3, wherein each of the plurality of repetitive segments further includes a second training field to be utilized for automatic gain control.

5. The method of claim 1, wherein the channel measurement frame is transmitted based on the omnidirectional mode and comprises a preamble that includes at least one of:
   a legacy training field;
   a legacy signal field;
   a non-legacy training field; and
   a non-legacy signal field.

6. The method of claim 1, wherein:
   the feedback frame is transmitted by the wireless communication device based on an omnidirectional mode; and
   the at least one beam is determined by the wireless communication device based on a signal-to-noise ratio at an output of the channel corresponding to each of the plurality of beams.

7. The method of claim 6, wherein the feedback frame further comprises information about at least one of:
   a beam identification for each of the at least one beam;
   the signal-to-noise ratio corresponding to each of the at least one beam; and
   a channel quality indication for the channel with respect to each of the at least one beam.

8. The method of claim 6, wherein the signal-to-noise ratio corresponding to a beam is an average signal-to-noise ratio across multiple space-time streams on the beam over a bandwidth of a resource block of the beam.

9. The method of claim 1, further comprising transmitting data to the wireless communication device through the channel based on the at least one beam.

10. A method performed by a wireless communication node, the method comprising:
    transmitting a channel measurement frame based on a plurality of beams to a wireless communication device through a channel between the wireless communication node and the wireless communication device, wherein the channel measurement frame comprises a training sequence including a plurality of repetitive segments, and each of the plurality of repetitive segments is transmitted based on a respective one of the plurality of beams; and
    receiving a feedback frame from the wireless communication device, wherein the feedback frame comprises channel information of the channel with respect to at least one beam of the plurality of beams; and
    transmitting a channel measurement announcement frame via broadcast to a plurality of wireless communication devices including the wireless communication device and at least one additional wireless communication device, before transmitting the channel measurement frame, wherein the channel measurement announcement frame is transmitted based on an omnidirectional mode to the plurality of wireless communication devices and informs the plurality of wireless communication devices to perform channel measurements based on the channel measurement frame, wherein the channel measurement announcement frame indicates the channel measurement frame is to be transmitted based on an omnidirectional mode.

11. The method of claim 10, further comprising transmitting a channel feedback scheduling frame to the plurality of wireless communication devices, wherein the channel feedback scheduling frame comprises at least one of:
    a feedback trigger frame configured for triggering the plurality of wireless communication devices to transmit feedback frames to the wireless communication node at the same time; and
    a feedback polling frame configured for scheduling the plurality of wireless communication devices to transmit feedback frames to the wireless communication node in turn.

12. A method performed by a wireless communication device, the method comprising:
    receiving a channel measurement frame that is transmitted by a wireless communication node based on a plurality of beams through a channel between the wireless communication device and the wireless communication node, wherein the channel measurement frame comprises a training sequence including a plurality of repetitive segments, and each of the plurality of repetitive segments is transmitted based on a respective one of the plurality of beams; and transmitting a feedback frame to the wireless communication node, wherein the feedback frame comprises channel information of the channel with respect to at least one beam of the plurality of beams; and receiving a channel measurement announcement frame via broadcast to a plurality of wireless communication devices including the wireless communication device and at least one additional wireless communication device, before receiving the channel measurement frame, wherein the channel measurement announcement frame is transmitted based on an omnidirectional mode to the plurality of wireless communication devices and informs the plurality of wireless communication devices to perform channel measurements based on the channel measurement frame, and wherein the channel measurement announcement frame indicates the channel measurement frame is to be transmitted based on an omnidirectional mode.

13. The method of claim 12, wherein:

the plurality of beams is formed by a multi-antenna array on the wireless communication node; and each of the plurality of beams points in a distinct direction.

14. The method of claim 12, wherein each of the plurality of repetitive segments includes a first training field to be utilized for channel measurement.

15. The method of claim 14, wherein each of the plurality of repetitive segments further includes a second training field to be utilized for automatic gain control.

\* \* \* \* \*